Dec. 4, 1923.

P. MANSEL 1,476,261

SYNCHRONIZER FOR SECONDARY CLOCKS

Filed Nov. 26, 1921

Inventor
Paul Mansel
by Knight Bro.
attorneys

Patented Dec. 4, 1923.

1,476,261

UNITED STATES PATENT OFFICE.

PAUL MANSEL, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

SYNCHRONIZER FOR SECONDARY CLOCKS.

Application filed November 26, 1921. Serial No. 518,079.

*To all whom it may concern:*

Be it known that I, PAUL MANSEL, residing at Berlin-Charlottenburg, Germany, have invented certain new and useful Improvements in Synchronizers for Secondary Clocks, of which the following is a specification.

The regulation of secondary clocks in accordance with the positions of the hands of a master clock has been hitherto effected in such a manner that, by means of a convenient switch, as many current impulses are sent through the leads for the secondary clocks as minutes or seconds are to be corrected. If the secondary clocks differ from the correct time for a larger number of minutes, the regulation is often omitted as it is troublesome and time-wasting.

The present invention has for its object to regulate the secondary clock or clocks in accordance with the regulation by hand of the minute hand of the master clock.

In order that the invention may be clearly understood, I shall proceed to describe the same with reference to the form of construction shown by way of example on the accompanying drawing, in which.

Figure 1:
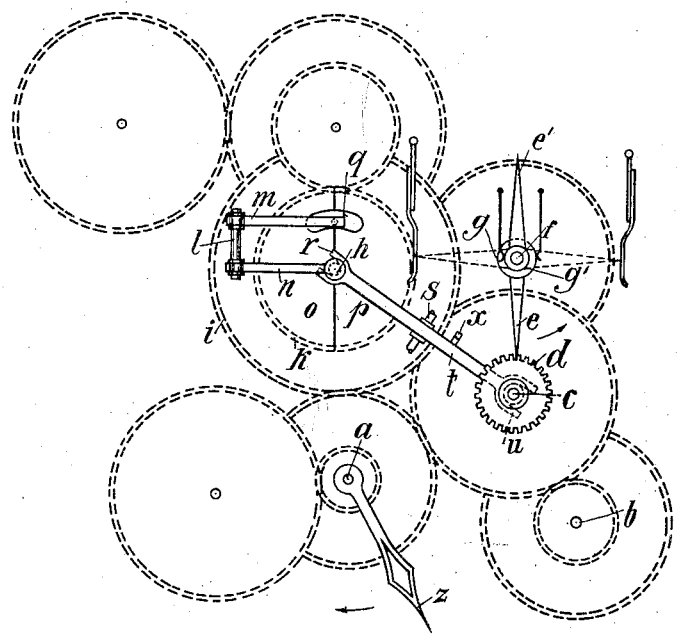
Fig. 1 is a front elevation of the improved automatic regulating device.

Referring to the drawing: $a$ designates the shaft of the minute hand, $b$ the shaft of the movement wheel, $c$ the shaft of a releasing toothed wheel $d$, which is revolved by the works of the master clock every minute for the length of one tooth and which together with two levers $e$, $e'$ gearing with the same controls the contact operation for the secondary clocks by means of a contact member $g$, $g'$ fixed on the shaft $f$ and designed to produce the current impulses.

Figure 3:
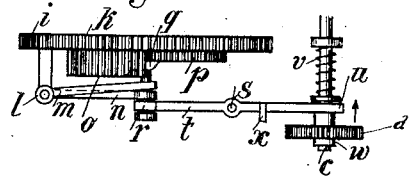
Fig. 3 shows in a plan view the feed-gear and its connection with the shaft driven from the train of the master clock.
Figure 2:
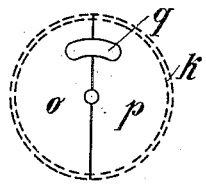
Fig. 2 shows the stepped disk in elevation.

According to the invention, two toothed wheels $i$ and $k$, forming the feed gear for controlling the contact operation of the secondary clocks, are mounted upon a shaft $h$, the wheel $i$ being driven by the train of the master clock and the wheel $k$ being driven by the movement for the contact device in such a manner that the wheels $i$ and $k$ revolve in the same sense and with the same angular speed and so that they execute one half revolution per hour. Upon the face of the wheel $i$ an axle $l$ is arranged, on which two levers $m$, $n$ are mounted, of which the one $m$ is in yielding contact with the wheel $k$. One-half $o$ of wheel $k$ is wider than the other half $p$. The two halves are connected with each other by a rising cam $q$, against which the lever $m$ bears at the normal working of the clocks. The lever $n$ is in engagement with the fork-shaped end $r$ of a lever $t$ (Figs. 1 and 3), which is adapted to oscillate around an axle $s$ in such a manner that said lever $t$ participates in the movements of the levers $m$ and $n$. The other end $u$ of said lever $t$ is also fork-shaped and engages a collar on the hub of the toothed wheel $d$ (Fig. 3), which works in conjunction with the lever $e$. Said toothed wheel $d$ is splined upon its shaft $c$ but axially slidable thereon and is acted upon by a spring $v$, which tends to press the same against a collar $w$ of the shaft $c$. In this position, the toothed wheel $d$ is situated in the plane in which the lever $e$ can oscillate, so that it works in conjunction with this lever. The lever $t$ has further an abutment $x$ designed to come in contact with the lever $e$ and to stop the same when the lever $t$ has adopted a determined position.

The operation of the regulating device is as follows:—

If the minute hand $z$ of the master clock is moved in the direction of the arrow (Fig. 1), the toothed wheel $i$ is revolved with regard to the toothed wheel $k$ and the lever $m$ slides from its mean position upon the higher step $o$ of the wheel $k$. Thereby, the levers $m$ and $n$ are turned and with the same also the lever $t$, so that it moves the toothed wheel $d$ against the action of spring $v$ in the direction of the arrow and brings the same out of engagement with the lever $e$ of the contact device. Said lever $e$ is now free to turn round under the action of the driving spring of the movement and to send current impulses over the leads to the secondary clocks until the toothed wheel $k$ has caught up with the wheel $i$ and the lever $m$ has again adopted its mean position, so that the toothed wheel $d$ comes again in engagement with the lever $e$, whereupon the normal contact giving begins again.

If the main clock is moved back and thus the minute hand is turned opposite to the direction of the arrow, the lever *m* drops upon the lower step *p* of the wheel *k*. The end *u* of the lever *t* is moved in opposite direction as before without taking, however, the toothed wheel *d* along, for which purpose the hub between the collar and the toothed wheel is made sufficiently long. By said movement of the lever *t* the abutment *x* is brought into the path of the lever *e* which is thus stopped and, the contact giving for the secondary clocks being interrupted, said clocks are stopped.

Said locking continues until the lever *m* returns to its normal position, that is to say, until the secondary clocks are in accordance with the master clock, whereupon the abutment *x* is withdrawn from the path of lever *e* and the normal contact giving is started again.

The application of the invention permits numerous modifications of details.

What I claim, is:

1. A device for an automatic regulation of secondary clocks in accordance with the regulation of the master clock comprising, in combination, a contact device for the secondary clocks, a feed-gear controlled by the train of the master clock and by the movement of said contact device, and means connecting said feed-gear with said contact device so that, according to the direction in which the master clock is being regulated, said contact device for the secondary clocks is locked or accelerated until the master clock and the secondary clocks are in accordance from which moment the normal working starts again, substantially as set forth.

2. A device for an automatic regulation of secondary clocks in accordance with the regulation of the master clock comprising, in combination, a contact device for the secondary clocks, a feed-gear consisting of a toothed wheel adapted to be revolved from the train of the master clock and of second toothed wheel co-axial with the first toothed wheel and adapted to be revolved in the same direction and at the same angular speed as the first toothed wheel from the movement of said contact device, said second wheel having three cam steps, a lever system carried by the first toothed wheel and bearing yieldingly upon said second wheel so that at the normal working it is in contact with the mean step of said second wheel but moves onto the higher or lower step when the master clock is regulated in one or the other direction, and means connecting said feed-gear with said contact device so that, according to the direction in which the master clock is being regulated, the contact device for the secondary clocks is locked or accelerated until the master clock and the secondary clocks are in accord, from which moment the normal working starts again, substantially as set forth.

3. A device for an automatic regulation of secondary clocks in accordance with the regulation of the master clock comprising, in combination, a contact device for the secondary clocks, a feed-gear consisting of a toothed wheel adapted to be revolved from the train of the master clock and of a second toothed wheel co-axial with the first toothed wheel and adapted to be revolved in the same direction and at the same angular speed as the first toothed wheel by the movement of said contact device, said second disk having three cam steps, a lever system carried by the first toothed wheel and bearing yieldingly upon said second wheel so that at the normal working it is in contact with the mean step of said second wheel but moves onto the higher or lower step when the master clock is regulated in one or the other direction, a control lever for said contact device, a toothed wheel for operating said control lever, adapted to be displaced on its shaft in axial direction, a lever connecting said toothed wheel with said lever system of the feed-gear, and an abutment on said connecting lever designed to stop the said control lever when the same is released by said toothed wheel as the master clock is retarded, said toothed wheel being brought out of engagement with said control lever when the master clock is advanced so that the contact device can be accelerated, substantially as set forth.

In testimony whereof I have hereunto set my hand in the presence of two subscribing witnesses.

PAUL MANSEL.

Witnesses:
ERNST SCHUMANN,
FRIEDRICH STEGEMANN.